(12) United States Patent
Pacheco (10) Patent No.: US 6,703,562 B1
(45) Date of Patent: Mar. 9, 2004

(54) WALL SOCKET PAINT SHIELD

(76) Inventor: Jason Christopher Pacheco, 744 Tom Fowler Ct., Tracy, CA (US) 95377

( * ) Notice: Subject to any disclaimer, the term of this patent is extended or adjusted under 35 U.S.C. 154(b) by 0 days.

(21) Appl. No.: 10/356,854

(22) Filed: Feb. 3, 2003

(51) Int. Cl.[7] .............................................. H02G 3/100
(52) U.S. Cl. ........................... 174/66; 174/67; 220/241; 220/242; 33/528
(58) Field of Search .................... 174/66, 67; 220/241, 220/242; 33/528, DIG. 10

(56) References Cited

U.S. PATENT DOCUMENTS

| | | | |
|---|---|---|---|
| 2,359,975 A | | 10/1944 | Duggan |
| 2,439,708 A | | 4/1948 | Abraham |
| 2,672,122 A | | 3/1954 | Kupec et al. |
| 2,925,064 A | | 2/1960 | Kahn |
| 3,113,174 A | | 12/1963 | Spiteri |
| 4,293,173 A | | 10/1981 | Tricca |
| 4,425,725 A | * | 1/1984 | Moustakas et al. ............ 40/725 |
| 5,003,128 A | | 3/1991 | Grondin |
| 5,063,872 A | | 11/1991 | Maus et al. |
| 5,285,014 A | | 2/1994 | Gilchrist |
| 5,525,755 A | | 6/1996 | Christensen |
| 5,723,816 A | * | 3/1998 | Neece ......................... 174/66 |
| 6,103,974 A | * | 8/2000 | Erdfarb ....................... 174/66 |

* cited by examiner

Primary Examiner—Dhiru R Patel
(74) Attorney, Agent, or Firm—Michael I. Kroll (57) ABSTRACT

The present invention (10) discloses a paint shield (12) that covers the exposed surfaces of a standard electrical wall outlet (16) and is includes of a planar plate (12) conforming substantially to the foot print of a receptacle cover plate (22) constructed of plastic, metal or other materials and having two pair of prongs (14) that temporarily attach the shield (12) to an electrical outlet (16), concealing the outlet (16) from paint that may enter the holes (18) during the process of painting a room. A handle (26) may also be provided and located on the opposite side of the plate (12) from the prongs (14).

1 Claim, 8 Drawing Sheets

FIG. 8

WALL SOCKET PAINT SHIELD

BACKGROUND OF THE INVENTION

1. Field of the Invention

The present invention relates generally to paint shields and, more specifically, to a paint shield that covers exposed surfaces of an electrical wall outlet and is comprised of a planar plate conforming substantially to the foot print of a receptacle cover plate, constructed of plastic, metal or other materials and having two pair of prongs that temporarily attach the shield to an electrical socket, concealing the outlet from paint that may enter the sockets during the process of painting a room. A handle may also be provided and located on the opposite side of the plate from the prongs. The handle serves to remove the plate from the wall socket without a struggle. The device is designed to save time from trimming around the wall socket and its cover plate by concealing it from the area around the socket that is to be painted.

2. Description of the Prior Art

There are other paint shield devices designed for concealing wall outlets. Typical of these is U.S. Pat. No. 2,359,975 issued to Duggan on Oct. 10, 1944.

Another patent was issued to Abraham on Apr. 13, 1948 as U.S. Pat. No. 2,439,708. Yet another U.S. Pat. No. 2,672,122 was issued to Kupec et al. on Mar. 16, 1954 and still yet another was issued on Feb. 16, 1960 to Kahn as U.S. Pat. No. 2,925,064.

Another patent was issued to Spiteri on Dec. 3, 1963 as U.S. Pat. No. 3,113,174. Yet another U.S. Pat. No. 4,293,173 was issued to Tricca on Oct. 6, 1981. Another was issued to Grondin on Mar. 26, 1991 as U.S. Pat. No. 5,003,128 and still yet another was issued on Nov. 12, 1991 to Maus et al. as U.S. Pat. No. 5,063,872.

Another patent was issued to Gilchrist on Feb. 8, 1994 as U.S. Pat. No. 5,285,014. Yet another U.S. Pat. No. 5,525,755 was issued to Christensen on Jun. 11, 1996. Another was issued to Neece on Mar. 3, 1998 as U.S. Pat. No. 5,723,816 and still yet another was issued on Aug. 15, 2000 to Erdfarb as U.S. Pat. No. 6,103,974.

U.S. Pat. No. 2,359,975

Inventor: James Edward Duggan

Issued: Oct. 10, 1944

The invention relates generally to devices that are used during painting or plating operations to protect portions of articles from paint or plating materials applied to adjacent portion thereof, and refers more particularly to paint masks for portions of cap type plugs adapted for use in governor housings carried by propeller hubs of airplanes.

U.S. Pat. No. 2,439,708

Inventor: Hans A. Abraham

Issued: Apr. 13, 1948

The invention relates to electric outlets, and more particularly to an outlet, for domestic use in connection with the customary pronged plugs, which will be free from the likelihood of shock or other injury to the user.

U.S. Pat. No. 2,672,122

Inventor: Emil J. Kupec et al.

Issued: Mar. 16, 1954

The present invention relates to improved ways and means whereby limited surfaces are temporarily covered by way of novel masking means and thus isolated from the adjacent surfaces in order that the isolated surfaces will not be splashed or smeared while paint is being brushed or sprayed on the surfaces which are to be painted.

U.S. Pat. No. 2,925,064

Inventor: George Kahn

Issued: Feb. 16, 1960

The invention relates to improved means for shielding and protecting such as building hardware while walls, doors, and the like are being brush-painted or sprayed, and more particularly to a device of this kind especially, but not exclusively, for shielding door Knobs and the associated door plates.

U.S. Pat. No. 3,113,174

Inventor: Joseph Spiteri

Issued: Dec. 3, 1963

The invention relates to electrical outlet covers and, more particularly, to electrical outlet covers wherein the electrical elements are protected from inadvertent contact by any part of the body of a person.

U.S. Pat. No. 4,393,173

Inventor: Raymond A. Tricca

Issued: Oct. 6, 1981

A thermal insulation system for electrical outlets installed against the outside walls of buildings. A large plate of special thermal insulation is secured behind the faceplate of the outlet. Other smaller plates of thermal insulation are placed over the receptacles of the electrical outlets. Dummy plugs are used to seal the slots of the receptacles and hold the small insulation plates in position.

U.S. Pat. No. 5.003,128

Inventor: Yvan Grondin

Issued: Mar. 26, 1991

This cover fits over and removably adheres to a wall-mounted electrical box or to an electrical component fixed to the box. The protecting cover is used, instead of masking tape, to protect the electrical elements from being soiled with paint during spray-gun painting.

U.S. Pat. No. 5,063,872

Inventor: Patricia Maus et al.

Issued: Nov. 12, 1991

The present invention provides a device for protecting a fixture during treatment of the surface on which the fixture is mounted. The fixture itself includes internal elements mounted behind the surface and at least one surface element which are exposed at the surface. The fixture also would normally include a fixture cover mounted on the fixture to cover the internal elements of the fixture and to cover a portion of the surface around the periphery of the fixture, while permitting the surface elements of the fixture to be exposed. In order to protect such a fixture, a protective cover is provided for temporarily replacing the fixture cover during the treatment of the surface. The protective cover includes a portion to cover the internal elements of the fixture to protect them from the surface treatment and a portion to cover the surface elements of the fixture to also protect them from the surface treatment. In addition, an arrangement is provided for securing the protective cover to a predetermined element of the fixture by frictionally fitting said cover to said element. As a preferred embodiment of this, the arrangement for securing the protective cover includes an arrangement for frictionally fitting the cover to one of the surface elements.

U.S. Pat. No. 5,285,014

Inventor: Gayland Gilchrist

Issued: Feb. 8, 1994

In accordance with illustrative embodiments of the present invention, a paint shield that covers all exposed surfaces of an electrical outlet or switch assembly and its cover plate includes a front wall having top, bottom and side walls extending rearward thereof, and devices such as a pair of prongs or a suction cup which temporarily attach the shield to the assembly with the rear edge sections of the top, bottom and side walls positioned tightly against the adjacent side surfaces of the cover plate. The shield has a handling tab on the front wall that is longitudinally aligned with the prongs or suction cup.

U.S. Pat. No. : 5,525,755

Inventor: Arthur E. Christensen

Issued: Jun. 11, 1996

A removable cover for shrouding an electrical component from the impingement of dust, plaster, paste or paint during a room surface finishing process, the electrical component being disposed in an electrical junction box mounted within a wall and having apertures formed therein. The removable cover includes a cap member for covering the electrical component when the removable cover is disposed over the electrical component. The removable cover also includes at least one plug member formed on the cap member for coupling the cap member to the electrical component. The plug member is configured so as to be securely disposed within an aperture of the electrical component when the removable cover is disposed over the electrical component.

U.S. Pat. No. 5,723,816

Inventor: James Neece

Issued: Mar. 3, 1998

A paint shield for electrical switches and outlets for covering an electrical outlet or light switch when the face plate is removed during painting of the wall thereby preventing paint from leaking into the socket. The inventive device includes a rectangular plate which includes a switch aperture, a right flexible clip and a left flexible clip which clamp to a light switch mesial, and a rubber arcuate cover surrounding the switch aperture.

U.S. Pat. No. 6,103,974

Inventor: Jeffrey Erdfarb

Issued: Aug. 15, 2000

This invention provides a paint cover, including a) a plate having a front and rear surface; b) the front surface having a top, bottom and side portions; c) top, bottom, and side continuous outer edges which project rearward from the front surface, wherein the outer edge is curved and tapered; d) the rear surface having a top, bottom and side portions; and e) a flexible arm extending rearwardly from each of the side portions of the rear surface, wherein the arms upon insertion into an outlet assembly frictionally engage the inside of the assembly so as to extend a force to secure the paint cover to an outlet box.

While these paint shields may be suitable for the purposes for which they were designed, they would not be as suitable for the purposes of the present invention, as hereinafter described. The present invention, a paint shield that covers exposed surfaces of an electrical wall outlet and is comprised of a plate, constructed of plastic, metal or other materials and housing two pair of prongs that temporarily attach the shield to an electrical socket, concealing the outlet from paint that may enter the sockets during the process of painting a room. A handle is located on the opposite side of the plate from the prongs. The handle serves to remove the plate from the wall socket without a struggle. The device is designed to save time from trimming around the wall socket and its cover plate by concealing it from the area around the socket that is to be painted.

SUMMARY OF THE PRESENT INVENTION

The present invention discloses a paint shield that covers the exposed surfaces of a standard electrical wall outlet and is comprised of a planar plate conforming substantially to the foot print of a receptacle cover plate, constructed of plastic, metal or other materials and having two pair of prongs that temporarily attach the shield to an electrical outlet, concealing the outlet from paint that may enter the holes during the process of painting a room. A handle may also be provided and located on the opposite side of the plate from the prongs.

A primary object of the present invention is to provide a paint shield that covers exposed surfaces of an electrical wall outlet.

Another object of the present invention is to provide a paint shield that covers exposed surfaces of an electrical wall outlet having a plate constructed of plastic, metal or other materials.

Yet another object of the present invention is to provide a paint shield that houses two pair of prongs that temporarily attach the shield to an electrical socket, concealing the outlet from paint that may enter the sockets during the process of painting a room.

Still yet another object of the present invention is to provide a paint shield with a handle located on the opposite side of the plate from the prongs for greater ease when inserting and removing the present invention from an electrical outlet Yet another object of the present invention is to provide a paint shield that is designed to save time from trimming around the wall socket and its cover plate by concealing it from the area around the socket that is to be painted.

Additional objects of the present invention will appear as the description proceeds.

The present invention overcomes the shortcomings of the prior art by providing a paint shield that covers exposed surfaces of an electrical wall outlet and is comprised of a plate constructed of plastic, metal or other materials and housing two pair of prongs that temporarily attach the shield to an electrical socket concealing the outlet from paint that may enter the sockets during the process of painting a room. A handle may be provided on the opposite side of the plate from the prongs. The handle serves to remove the plate from the wall socket without a struggle. The device is designed to save time from trimming around the wall socket and its cover plate by concealing it from the area around the socket that is to be painted.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 paint shield
14 prongs
16 electrical outlet
18 holes
20 wall
22 cover plate
24 spring prongs
26 handle

DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
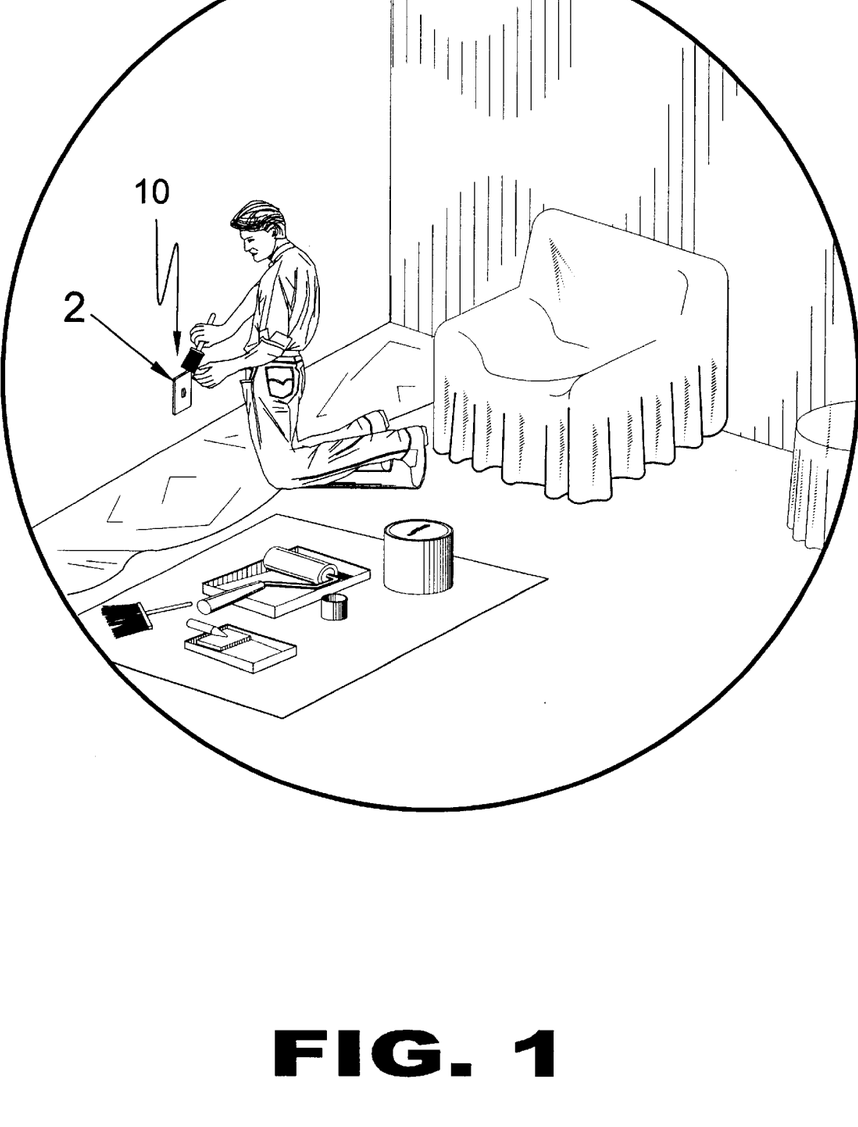
FIG. 1 is an illustrative view of the present invention in use.

Turning to FIG. 1, shown therein is an illustrative view of the present invention 10 in use. The present invention 10 is a paint shield for protecting the cover plate of an electrical receptacle during painting. The paint shield of the present invention 10 is comprised of a planar plate conforming substantially to the footprint of the receptacle cover plate having a handle on the exterior surface for selectively installing and removing the paint shield.

Figure 2:
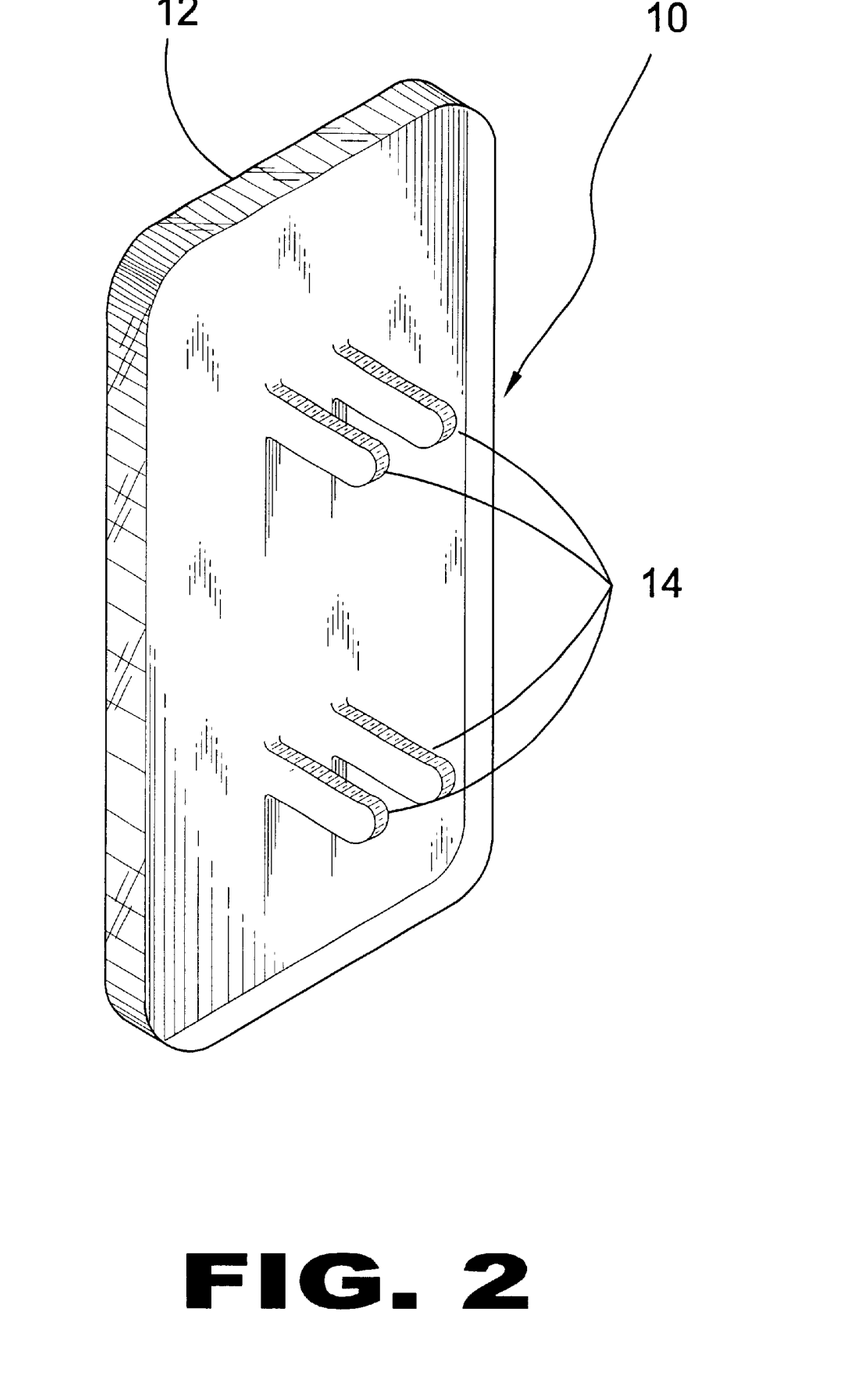
FIG. 2 is a rear perspective view of the present invention.

Turning to FIG. 2, shown therein is a rear perspective view of the present invention 10. The present invention 10 has a paint shield 12 having two pairs of prongs 14 that mate with the holes or sockets of a standard electrical receptacle. The prongs 14 are inserted into the holes or sockets of an electrical receptacle until the inner surface or periphery lip of the paint shield 12 engages the electrical receptacle cover plate. The periphery lip and planar plate 12 conform substantially to the electrical receptacle cover plate thereby providing means for a painter to leave the electrical receptacle cover plate on during painting. It is expected that the paint shield 12 would be made of electrically non-conducting material.

Figure 3:
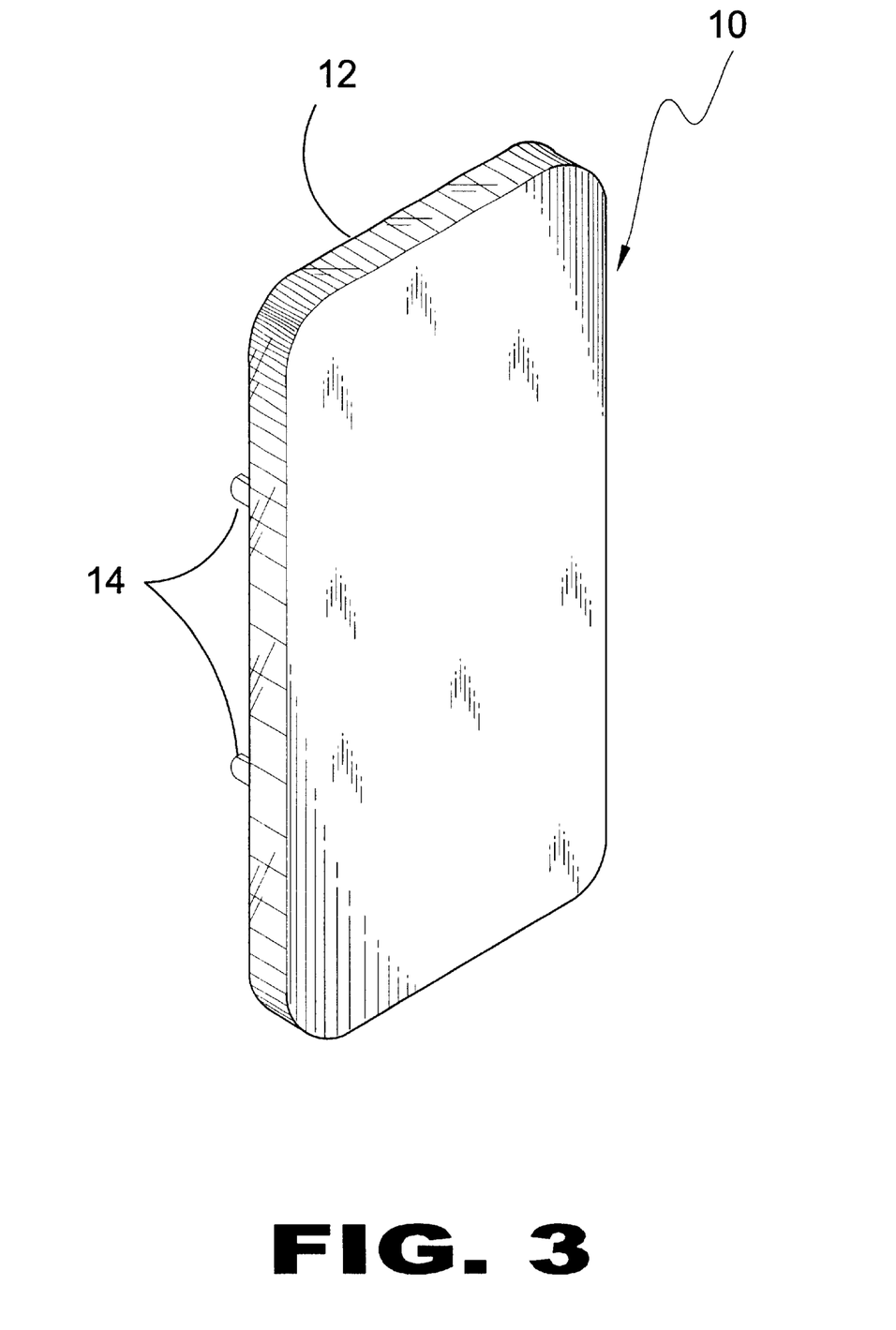
FIG. 3 is a front perspective view of the present invention.

Turning to FIG. 3, shown therein is a front perspective view of the present invention 10. The present invention 10 has a paint shield 12 that covers exposed surfaces of an electrical outlet and is comprised of a plate 12 having two pair of prongs 14 that temporarily attach the shield 12 to the electrical outlet, concealing the electrical outlet from paint that may enter the electrical sockets or holes during the process of room painting.

Figure 4:
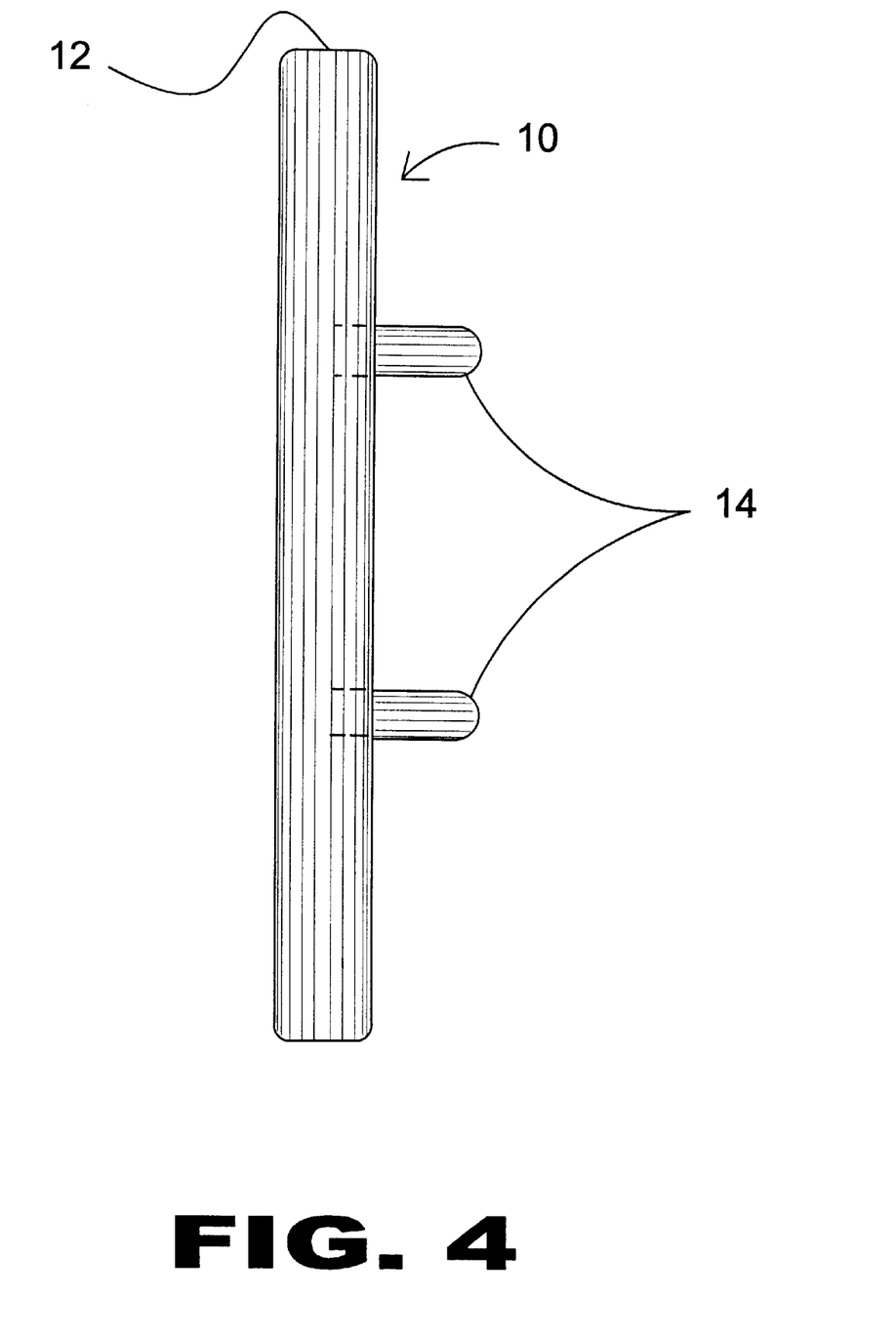
FIG. 4 is a side view of the present invention.

Turning to FIG. 4, shown therein is a side view of the present invention 10. Shown is the present invention 10 having a paint shield 12 that covers exposed surfaces of an electrical outlet and is comprised of a plate 12 having two pair of prongs 14 that temporarily attach the shield 12 to the electrical outlet.

Figure 5:
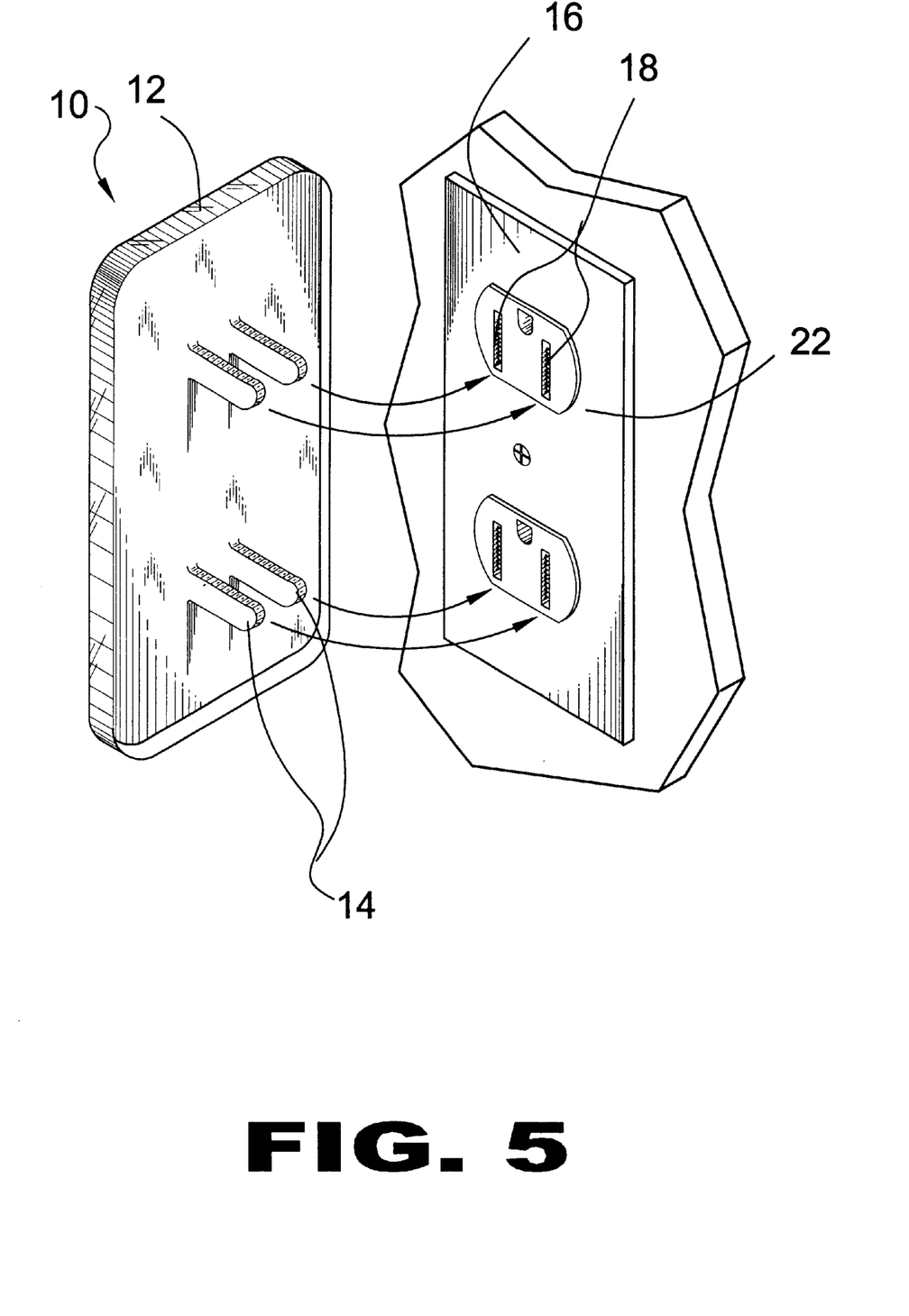
FIG. 5 is a perspective view of the present invention.

Turning to FIG. 5, shown therein is a perspective view of the present invention 10. Shown is the paint shield 12 of the present invention 10 along side an electrical outlet 16 having holes 18 therein which holes 18 are protected by the prongs 14 from paint that may enter them during the process of room painting. The cover plate 22 of the electrical outlet 16 is also shown.

Figure 6:
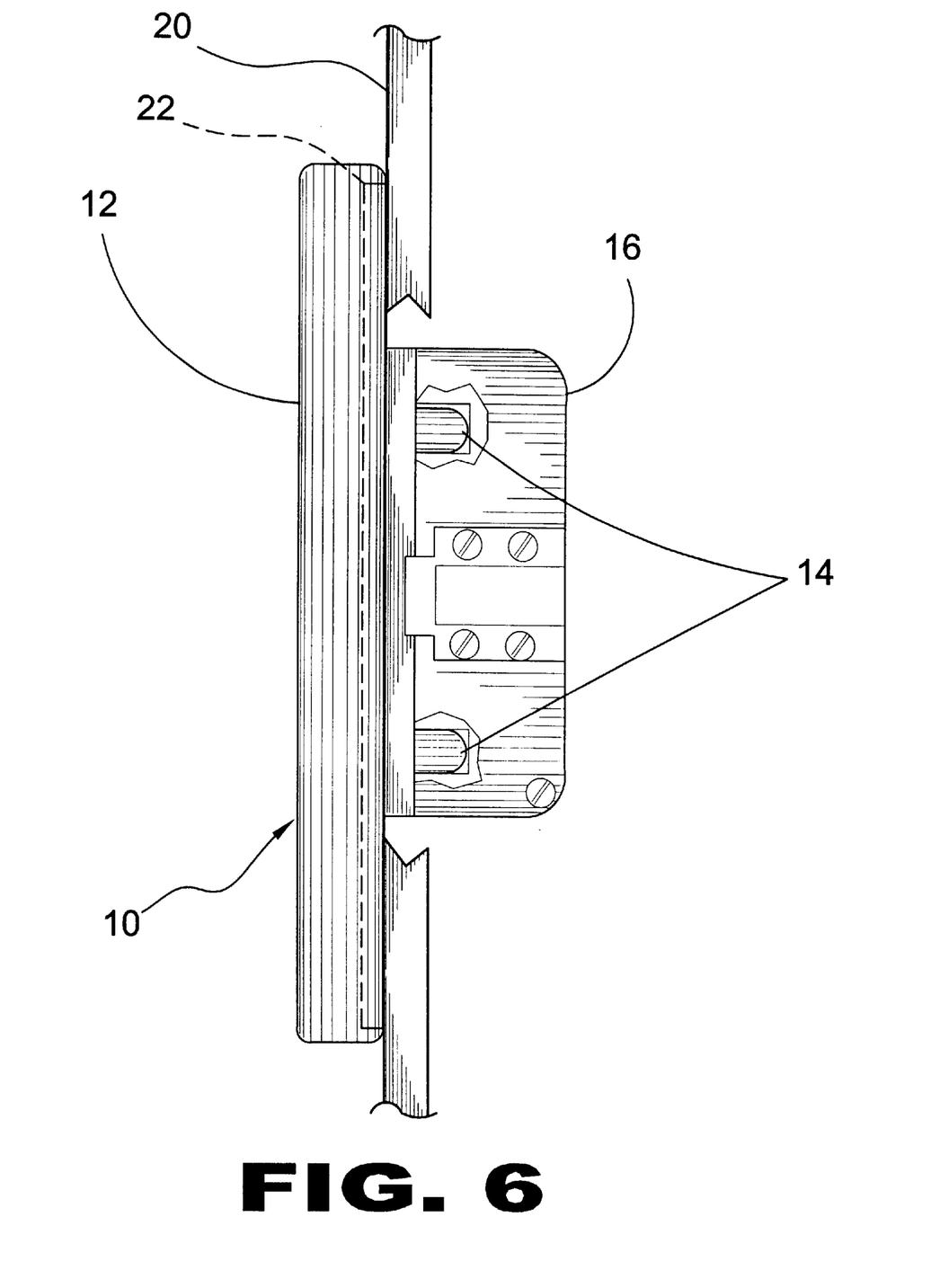
FIG. 6 is a side view of the present invention.

Turning to FIG. 6, shown therein is a side view of the present invention 10. Shown is the paint shield 12 of the present invention 10 with prongs 14 inserted within the electrical receptacle or outlet 16 and is comprised of a plate 12, having two pair of prongs 14 that temporarily attach the shield 12 to the electrical outlet 16, concealing the outlet 16 from paint that may enter the sockets or holes during the process of room painting. The wall 20 and cover plate 22 of the electrical receptacle 16 are also shown.

Figure 7:
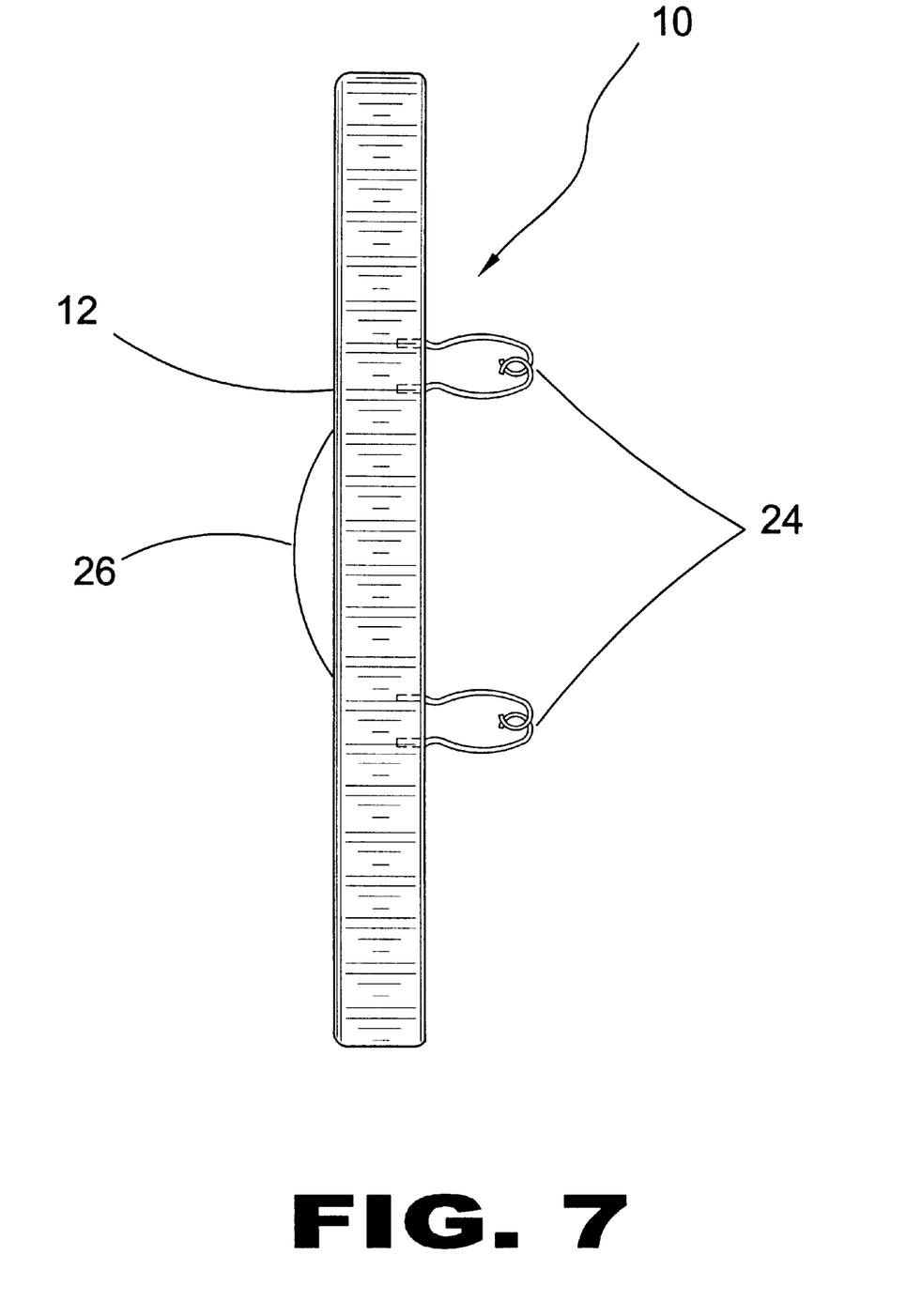
FIG. 7 is a side view of an alternate of the present invention.

Turning to FIG. 7, shown therein is a side view of an alternate embodiment of the present invention 10. Shown is an alternate design of the paint shield 12 of the present invention 10 being comprised of a plate 12 having two pair of spring-like prongs 24 that temporarily attach the shield to the electrical outlet, concealing the outlet from paint that may enter the sockets or holes during the process of room painting. The spring prongs 24 are designed to conform to the size of the sockets or holes they are inserted into. A handle member 26 is also provided on the front surface of the shield 12 for easy installation and removal.

Figure 8:
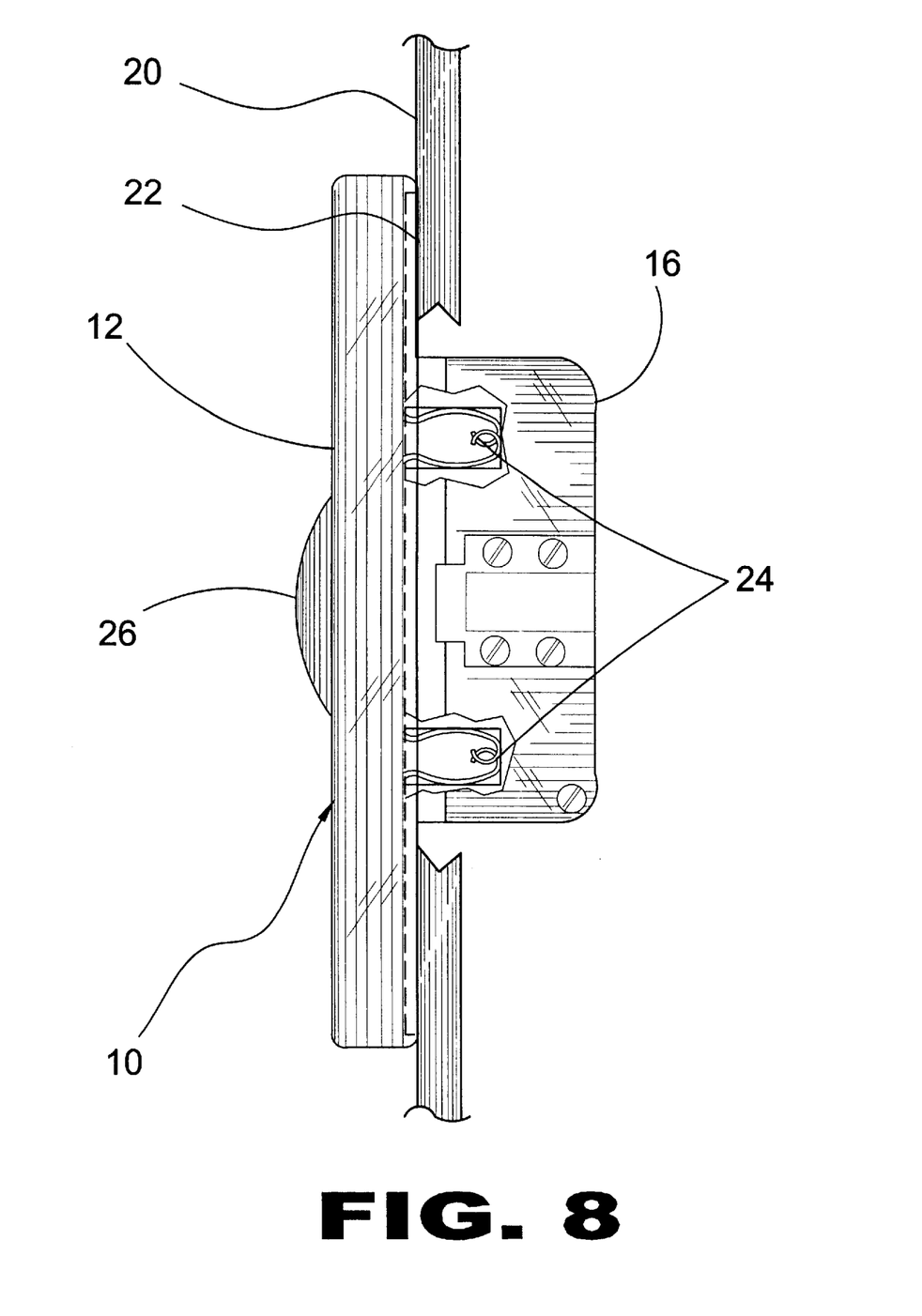
FIG. 8 is a side view of an alternate of the present invention.

Turning to FIG. 8, shown therein is a side view of an alternate of the present invention 10. Shown is an alternate design of the paint shield 12 of the present invention inserted within a wall electrical outlet 16 being comprised of a plate 12, having two pair of spring-like prongs 24 that temporarily attach the shield 12 to the electrical outlet 16, concealing the outlet 16 from paint that may enter the electrical receptacle 16 during the process of room painting. The spring prongs 24 are designed to conform to the size holes they are inserted into. Also shown are the wall 20, cover plate 22 and handle 26.

As clearly illustrated in FIGS. 7 and 8, each prong 24 is a spring member consisting of a pair of wires each having a proximate end embedded in the rear side of the shield spaced from each other, and a distal end of each wire forming a loop directed toward the other wire, the loops of the two wires overlapping each other.

What is claimed to be new and desired to be protected by Letters Patent is set forth in the appended claims:

1. A paint shield for temporarily shielding an electrical outlet from paint during painting, consisting of:
   a) a paint shield of electrical insulating material, said shield having a front and rear side for protecting an electrical outlet from paint while the area around the electrical outlet is being, painted, said electrical outlet having at least one pair of sockets therein, said sockets for insertion of an electrical plug;
   b) at least one pair of prongs disposed on said rear side of said paint shield, said prongs for insertion into the sockets on the electrical outlet to permit the electrical outlet to be protected, said prongs each comprising a spring member, said spring member being a pair of wires each having a proximate end embedded in the rear side of said shield, the proximate ends being spaced from each other, and a distal end of each wire forming a loop directed toward the other wire, the loops of the two wires overlapping each other to greater ease when inserting and removing the paint shield from said outlet;
   c) wherein said paint shield is complementarily sized to cover said electrical outlet;
   d) wherein said prongs are complementarily sized to fit the sockets of the electrical outlet to permit the paint shield to be secured to the electrical outlet; and
   e) a handle being disposed on said front side of said paint shield to permit a user to grasp the paint shield.

* * * * *